United States Patent
Kniajer et al.

(10) Patent No.: US 6,346,493 B1
(45) Date of Patent: Feb. 12, 2002

(54) DECORATIVE GLASS ENAMELS

(75) Inventors: Galina Kniajer, South Euclid, OH (US); Jeffrey David Cosby, Staffs (GB); Ivan H. Joyce, Hudson, OH (US); Srinivasan Sridharan, Strongsville, OH (US); John J. Maloney, Solon, OH (US)

(73) Assignee: Ferro Corporation, Cleveland, OH (US)

( * ) Notice: Subject to any disclaimer, the term of this patent is extended or adjusted under 35 U.S.C. 154(b) by 0 days.

(21) Appl. No.: 09/429,126

(22) Filed: Oct. 27, 1999

(51) Int. Cl.[7] .............................. C03C 8/04; C03C 8/06; C03C 8/14; C03C 8/18; C03C 8/20

(52) U.S. Cl. .............................. 501/17; 501/18; 501/19; 501/20; 501/25; 501/26; 501/32; 501/58; 501/59; 501/63; 501/64; 501/65; 501/66; 501/67; 501/69; 501/70; 501/78; 501/79

(58) Field of Search .............................. 501/16, 17, 18, 501/19, 20, 25, 26, 32, 58, 59, 63, 64, 65, 66, 67, 69, 70, 78, 79

(56) References Cited

U.S. PATENT DOCUMENTS

| | | | | |
|---|---|---|---|---|
| 2,786,782 A | * | 3/1957 | Zimmerman et al. | 501/26 |
| 4,285,731 A | | 8/1981 | Nigrin | |
| 4,361,654 A | * | 11/1982 | Ohmura et al. | 501/26 |
| 4,493,900 A | * | 1/1985 | Nishino et al. | 501/26 |
| 4,883,705 A | * | 11/1989 | Kawakami et al. | |
| 4,970,178 A | | 11/1990 | Klimas et al. | 501/26 |
| 5,149,565 A | | 9/1992 | Johnson et al. | |
| 5,194,303 A | * | 3/1993 | Nigrin et al. | |
| 5,200,369 A | * | 4/1993 | Clifford et al. | 501/66 |
| 5,262,363 A | | 11/1993 | Yoshida et al. | 501/17 |
| 5,304,516 A | | 4/1994 | Clifford | 501/21 |
| 5,306,674 A | | 4/1994 | Ruderer et al. | 501/70 |
| 5,342,810 A | | 8/1994 | Merigaud et al. | 501/26 |
| 5,350,718 A | | 9/1994 | Anquetil et al. | 501/21 |
| 5,559,059 A | | 9/1996 | Ryan | 501/26 |
| 5,618,764 A | | 4/1997 | Usui et al. | 501/17 |
| 5,674,789 A | | 10/1997 | Anquetil | 501/50 |
| 5,677,251 A | | 10/1997 | Sakoske | 501/17 |
| 5,707,909 A | | 1/1998 | Heitmann et al. | 501/59 |
| 5,747,395 A | * | 5/1998 | Smith et al. | 501/26 |
| 5,843,853 A | | 12/1998 | Heitmann et al. | 501/17 |
| 6,087,282 A | * | 7/2000 | Panzera et al. | 501/21 |

FOREIGN PATENT DOCUMENTS

| | | | |
|---|---|---|---|
| AU | 8177337 | * | 5/1983 |
| SU | 1299992 | * | 3/1987 |
| SU | 1557115 | * | 4/1990 |

OTHER PUBLICATIONS

Lewis, Hawley's Condensed Chemical Dictionary, p. 1063, 1993.*

* cited by examiner

*Primary Examiner*—David R Sample
(74) *Attorney, Agent, or Firm*—Rankin, Hill, Porter & Clark LLP

(57) ABSTRACT

The present invention provides a new and improved lead-free and cadmium-free glass enamel composition that displays good flow at traditional glass enamel firing temperatures and upon firing produces an enamel finish that displays no cracking, good chemical resistance, good weatherability, and improved color values. The glass enamel composition of the present invention includes a glass component, an oxidizer, a pigment system, and optional vehicles and fillers. The presence of the oxidizer in the composition, which can be included as part of the glass component, as a separately added material, or both, improves the color values of the fired enamel as compared to enamels formed using similar glass enamel compositions having no oxidizer present.

4 Claims, No Drawings

DECORATIVE GLASS ENAMELS

FIELD OF INVENTION

The present invention provides a new and improved lead-free and cadmium-free glass enamel composition for use in decorating glass articles such as, for example, architectural glass plate.

BACKGROUND OF THE INVENTION

Various lead-free and cadmium-free glass enamel compositions are known in the prior art. Examples include the compositions described in Ruderer, et al., U.S. Pat. No. 5,306,674; Heitmann, et al., U.S. Pat. No. 5,707,909; Clifford, U.S. Pat. No. 5,304,516; Klimas, et al., U.S. Pat. No. 4,970,178; Anquetil, et al., U.S. Pat. No. 5,350,718; and Anquetil, U.S. Pat. No. 5,674,789. Such enamel compositions are often applied in the form of a paste to a glass surface to be enameled. The paste usually contains finely divided particles of one or more glassy materials, commonly called "glass frits," one or more colorants or pigments, fillers, and a vehicle. After application of the paste by screen printing or other techniques, the composition is fired to volatilize and/or thermally decompose and drive off the vehicle, fuse the glass frits, pigments, and fillers together, and bond the enamel to the glass surface.

For many applications, a lead-free and cadmium-free glass enamel composition must display good flow at traditional glass enamel firing temperatures (typically from about 550° C. to about 720° C.). Upon firing, such enamel compositions preferably produce an enamel finish that displays no cracking, good chemical resistance, and good weatherability. Several prior art glass enamel compositions can be used to produce enamels exhibiting these properties, but there is a need for a lead-free and cadmium-free glass enamel composition that exhibits improved color values upon firing in addition to these properties.

SUMMARY OF INVENTION

The present invention provides a new and improved lead-free and cadmium-free glass enamel composition that displays good flow at traditional glass enamel firing temperatures and upon firing produces an enamel finish that displays no cracking, good chemical resistance, good weatherability, and improved color values. The glass enamel composition of the present invention comprises a glass component, an oxidizer, a pigment system, and optional fillers. The glass component preferably comprises one or more glass frits comprising from about 28% to about 60% by weight $SiO_2$, from about 9% to about 21% by weight $B_2O_3$, up to about 15% by weight $Na_2O$, up to about 13% by weight $K_2O$, up to about 6% by weight $Li_2O$, up to about 6% by weight $Al_2O_3$, up to about 25% by weight $TiO_2$, from about 5% to about 22% by weight ZnO, up to about 20% by weight $Nb_2O_5$, up to about 9% by weight $Bi_2O_3$, up to about 11% by weight $ZrO_2$, up to about 12% by weight BaO, up to about 8% by weight SrO, up to about 5% by weight CaO, up to about 2% by weight MgO, up to about 5% weight $LnO_x$, where "Ln" is an element selected from the Lanthanide Series and is most preferably an element selected from the group consisting of La, Ce, Pr, and Nd, up to about 6% by weight $Sb_2O_3$, and up to about 6% by weight fluorine. The presence of the oxidizer in the composition, which can be included as part of the glass component, as a separately added material, or both, significantly improves the color values of the fired enamel as compared to enamels formed using similar glass enamel compositions having no oxidizer present. When the oxidizer is included as part of the glass component, the oxidizer preferably comprises $Sb_2O_3$, $NH_4NO_3$, or $K_2S_2O_8$. Alternatively, the oxidizer can be included as part of the glass component as one or more low temperature decomposing nitrates such as $NaNO_3$ and $KNO_3$, persulfates such as $(NH_4)_2S_2O_8$ and $K_2SO_4$, peroxides such as $BaO_2$ and $ZnO_2$, antimonates such as $NaSbO_3$, $CaSb_2O_6$ and sulfates such as $Na_2SO_4$, and for colored glasses, as one or more chromates and/or permanganates. When the oxidizer is included as a separately added material, the oxidizer preferably comprises one or more compounds selected from the group consisting of peroxides such as barium peroxide, zinc peroxide, and hydrogen peroxide, and persulfates such as ammonium persulfate, and potassium persulfate. A broad range of pigment systems can be used in the invention, including white pigments systems based upon $TiO_2$, $CeO_2$, $ZrO_2$, and zircon, and colored pigment systems conventionally used to produce colors such as blue, brown, and black.

The foregoing and other features of the invention are hereinafter more fully described and particularly pointed out in the claims, the following description setting forth in detail certain illustrative embodiments of the invention, these being indicative, however, of but a few of the various ways in which the principles of the present invention may be employed.

DETAILED DESCRIPTION OF PREFERRED EMBODIMENTS

The present invention provides a new and useful lead-free and cadmium-free glass enamel composition that displays good flow at traditional glass enamel firing temperatures. Upon firing, the composition of the present invention forms an enamel finish having good chemical resistance, no cracking, good weatherability, and improved color values. As noted above, a need exists in the glass enamel industry for a lead-free and cadmium-free glass enamel composition that exhibits these properties.

The glass enamel composition of the present invention is lead-free and cadmium-free. As used throughout this specification in the claims below, the terms "lead-free" and "cadmium-free" mean that no lead, or PbO, cadmium, or CdO, have been intentionally added to the composition, and that the composition comprises less than about 0.5% by weight PbO or CdO.

The glass enamel composition of the present invention comprises a glass component, an oxidizer, a pigment system, and optional fillers. The glass enamel composition according to the present invention is preferably mixed with a suitable vehicle or carrier which allows the enamel composition to be applied to a section of glass in a convenient form such as, for example, a slurry, a paste, or a thermoplastic pellet.

The glass component of the glass enamel composition of the present invention preferably comprises one or more glass frits. Preferably, the glass component of the present invention displays the following composition:

| Component | Percent by Weight | Preferred Percent by Weight |
|---|---|---|
| $SiO_2$ | 28–60 | 31–55 |
| $B_2O_3$ | 9–21 | 11–19 |
| $Na_2O$ | 0–15 | 6–11 |
| $K_2O$ | 0–13 | 0–5 |

-continued

| Component | Percent by Weight | Preferred Percent by Weight |
|---|---|---|
| $Li_2O$ | 0–6 | 0–4 |
| $Al_2O_3$ | 0–6 | 0–4 |
| $TiO_2$ | 0–25 | 0–9 |
| ZnO | 5–22 | 11–21 |
| $Nb_2O_5$ | 0–20 | 0–17 |
| $Bi_2O_3$ | 0–9 | 0–5 |
| $ZrO_2$ | 0–11 | 0–7 |
| BaO | 0–12 | 0–5 |
| SrO | 0–8 | 0–5 |
| CaO | 0–5 | 0–3 |
| MgO | 0–2 | 0–1 |
| $LnO_x$(*) | 0–5 | 0–3 |
| $Sb_2O_3$ | 0–6 | 0.25–6 |
| F | 0–6 | 0–3 |

(*) where "Ln" is an element selected from the Lanthanide Series and is most preferably an element selected from the group consisting of La, Ce, Pr, and Nd.

The glass frits employed in the present invention may be prepared utilizing conventional glass melting techniques, which are well known in the art. Typically, a 500 g. batch is smelted at around 1250° C.±100° C. for about 30–60 minutes and the molten glass is then converted to frit by water quenching or using water-cooled rollers. It will be appreciated that production of the glass frits used in the invention is conventional, and that any of the various techniques well known to those skilled in the art can be employed.

As noted, the glass enamel composition according to the present invention also comprises an oxidizer. The oxidizer contributes to the improved color values of the enamel upon firing. The oxidizer may be included in the glass component, or it may be included in the enamel composition as a separately added material. Alternatively, the oxidizer may be included both in the glass component and as a separately added material. In all cases, the oxidizer should be stable at room temperatures in the presence of the other components that comprise the composition.

When the oxidizer is included in the glass component, it preferably comprises one or more compounds selected from the group consisting of $Sb_2O_3$, $NH_4NO_3$, and $K_2S_2O_8$. Alternatively, the oxidizer can be included as part of the glass component as one or more low temperature decomposing nitrates such as $NaNO_3$ and $KNO_3$, persulfates such as $(NH_4)_2S_2O_8$ and $K_2SO_4$, peroxides such as $BaO_2$ and $ZnO_2$, antimonates such as $NaSbO_3$ and $CaSb_2O_6$ and sulfates such as $Na_2SO_4$, and for colored glasses, as one or more chromates and/or permanganates.

When the oxidizer comprises $Sb_2O_3$ included in the glass component, it is preferable that the glass component be processed in an oxidizing atmosphere to assist in converting the $Sb_2O_3$ to $Sb_2O_4$, which serves as the oxidizer during subsequent firing. Production scale furnaces typically include means for controlling the composition of the processing atmosphere. However, it will be appreciated that nitrates can be included in the $Sb_2O_3$ containing batch materials as an alternative to processing the glass component in an oxidizing atmosphere. This is a particularly useful alternative when preparing small laboratory scale batches using an electric furnace in air.

The amount of oxidizer to be smelted into the glass will depend, in part, upon whether an oxidizer is also being included in the enamel composition as a separately added material. Although greater amounts of oxidizer can be used without adverse consequences, generally an amount comprising from about 0.25% to about 6% by weight of the glass component is sufficient to obtain the desired improved color values.

When the oxidizer is included in the composition as a separately added material, preferably it comprises one or more compounds selected from the group consisting of peroxides such as barium peroxide, zinc peroxide, and hydrogen peroxide, and persulfates such as ammonium persulfate, and potassium persulfate. It will be appreciated that the composition of the oxidizer is not per se critical, and any compound or combination of compounds that provide oxidation during firing and which do not interfere with enamel formation can be used in the invention. The oxidizer can be separately added to the enamel composition during milling as a mill addition, as part of the vehicle or carrier, or to the paste subsequent to milling.

Although in the preferred embodiment of the invention the oxidizer comprises a material which is specifically added to the glass component or separately added to the enamel composition to provide oxidation during firing, the desired improved color values can be also be obtained within the scope of the invention by including an oxidizer in the glass component as a remnant. One method of creating an oxidizer in the glass component as a remnant is by bubbling oxygen through the molten glass during processing, a portion of which will be captured and retained in the solid glass when the molten glass is converted to frit.

It is believed that the presence of the oxidizer in the enamel composition according to the present invention improves the color values of the fired enamel by keeping transition elements such as, for example, titanium, niobium, iron and zinc, in their most oxidized state. By keeping these transition elements in their most oxidized state, the oxidizer prevents the formation of undesired color centers in the fired enamel. It is also believed that the presence of the oxidizer in the composition according to the present invention prevents undesired glass/pigment interactions from occurring, which can also lead to the development of undesired color formation.

In addition to the glass component and oxidizer, the glass enamel composition according to the present invention also includes a pigment system. For white enamels, the preferred white pigment system comprises $TiO_2$. While other white pigment systems can successfully be used in the invention, such as for example, $CeO_2$, $ZrO_2$, and zircon, $TiO_2$ is nevertheless preferred because it has a higher refractive index (both anatase and rutile) than most other white pigment systems, and $TiO_2$ is readily available. Colored pigment systems can also be used in the invention. Examples of potential suitable color pigments include copper chrome black sold under the trade designation K-393-2, iron nickel manganese chrome black sold under the trade designation V792, cobalt aluminate blue sold under the trade designation V-3285, zinc iron chrome brown sold under the trade designation K-2102, and iron cobalt chrome black sold under the trade designation F-6340, all sold by the Ferro Corporation of Cleveland, Ohio.

The glass enamel composition according to the present invention also optionally includes one or more fillers. Examples of suitable fillers include alumina, zircon, cordierite, willemite, beta-eucryptite, spodumene, and silicon dioxide. It will be appreciated that the composition of the optional filler is not per se critical, and that any desired filler that does not adversely affect the enamel firing temperature can be used in the invention.

The glass enamel composition according to the present invention is utilized in the production of a section of formed decorated glass by first mixing the glass component, oxidizer, pigment system, and one or more optional fillers and vehicles, if so desired, so as to produce a form appropriate for application of the enamel composition to a section of glass. The solids portion of the enamel composition comprises at least about 40% by weight of the enamel composition. As used in this specification and in the claims below, the term "solids portion" means that part of the glass enamel composition that survives firing. Preferably, the solids portion comprises at least about 60% by weight of the enamel composition. More preferably, the solids portion comprises at least about 70% by weight of the enamel composition.

Preferably, the glass component comprises at least about 15% by weight of the solids portion of the glass enamel composition. More preferably, the glass component comprises from about 25% by weight to about 95% by weight of the solids portion of the glass enamel composition. When the oxidizer is a separately added material, the oxidizer enamel composition. The pigment system generally comprises from about 5% to about 30% of the solids portion of the glass enamel composition according to the present invention. Any optional fillers used in the composition generally comprise up to about 30% by weight of the solids portion of the enamel composition.

The following examples are intended only to illustrate the invention and should not be construed as imposing limitations upon the claims.

EXAMPLE I

Glass enamel compositions 1–12 were prepared such that the solids portion of each glass enamel composition comprised 90% by weight of a glass component and 10% by weight of a white pigment system. The glass component of each glass enamel composition was based upon a base glass frit having the following composition (in weight percent): $SiO_2$ 32.4%; $B_2O_3$ 18.3%; $Li_2O$ 0.8%; $Na_2O$ 6.6%; $K_2O$ 3.4%; $ZrO_2$ 6.7%; $TiO_2$ 0.8%; $ZnO$ 14.1%; and $Nb_2O_5$ 16.9%. An additional 3% by weight of fluorine was added above the weight of the other constituents of the glass component. In each composition, the white pigment system comprised $TiO_2$ available as TI-PURE® R960 from E.I. du Pont de Nemours and Company of Wilmington, Del. In glass enamel compositions 2–7 and 11–12, one or more oxidizers were smelted into the base glass frit. In each of these compositions, the glass component and the pigment system was ground in water to an average particle size of about 3.5 microns in a ceramic ball mill. The amounts shown in Table I below are the weight percentages of oxidizer added to the base glass frit.

In glass enamel compositions 8–12, an oxidizer was present as a separately added material. In each composition, the oxidizer was added as a mill addition. The amounts shown in Table I below are the weight percentages of oxidizer added to the glass component and white pigment system as a separately added material. (Note: glass enamel compositions 11–12 included oxidizers smelted into the base glass frit and as separately added materials).

100 g. of the solids portion of glass enamel compositions 1–12 were each blended with 50 g. of a vehicle sold under the trade designation C42 by Ferro Corporation of Cleveland, Ohio, and applied to a 3 mm section of architectural glass by screen printing to a thickness of about 2–3 mils. The architectural glass sections were then fired in a preheated electric box furnace for about 160 seconds at a temperature of about 715° C. After cooling, the whiteness of each enameled section of architectural glass was measured using a spectrophotometer (Spectraflash 600 from Data Color International; illuminant: D65; observer 10°; specular reflectance included) and reported in Table I below in terms of L* value (where, according to the CIE 1976 L*a*b* uniform color space system, $L^*=116(Y/Y_0)^{1/3}-16$; and Y and $Y_0$ are coordinates of the tristimulus values of the sample and illuminant, respectively). As noted in Table I below, the presence of an oxidizer, whether smelted in the base glass or present as a separately added material, or both, leads to the development of an enamel that is substantially more white than an enamel formed using a similar composition having no oxidizer present (e.g., glass enamel composition 1).

TABLE I

| Glass Enamel Composition | Oxidizer (wt. % $Sb_2O_3$ smelted into base glass) | Oxidizer (wt. % $NH_4NO_3$ smelted into base glass) | Oxidizer (wt. % $K_2S_2O_8$ present as mill added material) | Whiteness (L*) |
|---|---|---|---|---|
| 1 | — | — | — | 78.1 |
| 2 | 0.5 | 1.0 | — | 81.4 |
| 3 | 0.5 | 2.0 | — | 83.8 |
| 4 | 0.5 | 2.0 | — | 84.7 |
| 5 | 0.5 | 5.0 | — | 85.5 |
| 6 | — | 1.0 | — | 81.1 |
| 7 | 0.5 | 1.0 | — | 84.4 |
| 8 | — | — | 0.5 | 80.0 |
| 9 | — | — | 1.0 | 82.8 |
| 10 | — | — | 3.0 | 82.1 |
| 11 | 0.5 | 2.0 | 1.0 | 87.1 |
| 12 | 0.5 | 2.0 | 2.0 | 88.2 |

EXAMPLE II

Glass enamel compositions 13–17 were prepared such that the solids portion of enamel composition comprised 82% by weight of a glass component and 18% by white pigment system. The glass component of each glass enamel composition was based upon a base glass frit having the following composition (in weight percent): $SiO_2$ 52.5%; $B_2O_3$ 13.1%; $Na_2O$ 9.1%; $K_2O$ 2.5%; $Li_2O$ 3.0%; $Al_2O_3$ 3.5%; $TiO_2$ 3.2%; and $ZnO$ 13.1%. An additional 1.1% by weight of fluorine was added above the weight of the other constituents of the glass component. In each composition, the white pigment system comprised $TiO_2$ available as TI-PURE® R960 from E.I. du Pont de Nemours and Company of Wilmington, Del.

In glass enamel compositions 14, 15 and 17, one or more oxidizers were smelted into the base glass frit. In each of these compositions, the glass component and the pigment system was ground in water to an average particle size of about 3.5 microns in a ceramic ball mill. The amounts shown in Table II below are the weight percentages of oxidizer added to the base glass frit.

In glass enamel compositions 16–17, an oxidizer was present as a separately added material. In each composition, the oxidizer was added as a mill addition. The amounts shown in Table II below are the weight percentages of oxidizer added to the glass component and white pigment system as a separately added material. (Note: glass enamel compositions 17 included oxidizers smelted into the base glass frit and as separately added materials).

100 g. of the solids portion of glass enamel compositions 13–17 were each blended with 50 g. of a vehicle sold under the trade designation C42 by Ferro Corporation of Cleveland, Ohio, and applied to a 3 mm section of architectural glass by screen printing to a thickness of about 2–3 mils. The architectural glass sections were then fired in a preheated electric box furnace for about 160 seconds at a temperature of about 715° C. After cooling, the whiteness of each enameled section of architectural glass was measured using a spectrophotometer (Spectraflash 600 from Data Color International; illuminant: D65; observer 10°; specular reflectance included) and reported in Table II below in terms of L* value (where, according to the CIE 1976 L*a*b* uniform color space system, $L^*=116(Y/Y_0)^{1/3}-16$; and Y and $Y_0$ are coordinates of the tristimulus values of the sample and respectively). As noted in Table II below, the presence of an oxidizer, whether the base glass or present as a separately added material, or both, leads to the development of an enamel that is substantially more white than an enamel formed using a similar position having no oxidizer present (e.g., glass enamel composition 13).

$SiO_2$ 51.5%; $B_2O_3$ 12.9%; $Na_2O$ 8.9%; $K_2O$ 2.5%; $Li_2O$ 3.0%; $Al_2O_3$ 3.5%; $TiO_2$ 3.0%; ZnO 12.9%; and BaO 1.8%. In each composition, the white pigment system comprised $TiO_2$ available as TI-PURE® R960 from E.I. du Pont de Nemours and Company of Wilmington, Del.

In glass enamel compositions 19 and 21, oxidizers were smelted into the base glass frit. In each of these compositions, the glass component and the pigment system was ground in water to an average particle size of about 3.5 microns in a ceramic ball mill. The amounts shown in Table Ill below are the weight percentages of oxidizer added to the base glass frit.

In glass enamel compositions 20 and 21, an oxidizer was present as a separately added material. In each composition, the oxidizer was added as a mill addition. The amounts shown in Table III below are the weight percentages of oxidizer added to the glass component and white pigment system as a separately added material. (Note: glass enamel composition 21 included oxidizers smelted into the base glass frit and as separately added materials).

b 100g. of the solids portion of glass enamel compositions 18–21 were each blended with 50 g. of a vehicle sold under the trade designation C42 by Ferro Corporation of Cleveland, Ohio, and applied to a 3 mm section of architectural glass by screen printing to a thickness of about 2–3 mils. The architectural glass sections were then fired in a preheated electric box furnace for about 160 seconds at a temperature of about 715° C. After cooling, the whiteness of each enameled section of architectural glass was measured using a spectrophotometer (Spectraflash 600 from Data Color International; illuminant: D65; observer 10; specular reflectance included) and reported in Table III below in terms of L* value (where, according to the CIE 1976 L*a*b* uniform color space system, $L^*=116(Y/Y_0)^{1/3}-16$; and Y and $Y_0$ are coordinates of the tristimulus values of the sample and illuminant, respectively). As noted in Table III below, the presence of an oxidizer, whether smelted in the base glass or present as a separately added material, or both, leads to the development of an enamel that is substantially more white than an enamel formed using a similar composition having no oxidizer present (e.g., glass enamel composition 18).

TABLE II

| Glass Enamel Composition | Oxidizer (wt. % $Sb_2O_3$ smelted into base glass) | Oxidizer (wt. % $NH_4NO_3$ smelted into base glass) | Oxidizer (wt. % $K_2S_2O_8$ present as mill added material) | Whiteness (L*) |
|---|---|---|---|---|
| 13 | — | — | — | 90.0 |
| 14 | 0.5 | — | — | 91.0 |
| 15 | 0.5 | 2.0 | — | 91.8 |
| 16 | — | — | 1.0 | 90.3 |
| 17 | 0.5 | 2.0 | 1.0 | 91.7 |

Glass enamel compositions 18–21 were prepared such that the solids portion of each glass enamel composition comprised 82% by weight of a glass component and 18% by weight of a white pigment system. The glass component of each glass enamel composition was based upon a base glass frit having the following composition (in weight percent)

TABLE III

| Glass Enamel Composition | Oxidizer (wt. % $Sb_2O_3$ smelted into base glass) | Oxidizer (wt. % $NH_4NO_3$ smelted into base glass) | Oxidizer (wt. % $K_2S_2O_8$ present as mill added material) | Whiteness (L*) |
|---|---|---|---|---|
| 18 | — | — | — | 90.0 |
| 19 | 0.5 | 1.0 | — | 90.9 |

TABLE III-continued

| Glass Enamel Composition | Oxidizer (wt. % Sb$_2$O$_3$ smelted into base glass) | Oxidizer (wt. % NH$_4$NO$_3$ smelted into base glass) | Oxidizer (wt. % K$_2$S$_2$O$_8$ present as mill added material) | Whiteness (L*) |
|---|---|---|---|---|
| 20 | — | — | 1.0 | 90.4 |
| 21 | 0.5 | 1.0 | 1.0 | 91.8 |

EXAMPLE IV

Glass enamel compositions 22–25 were prepared such that the solids portion of each glass enamel composition comprised 83.5% by weight of a glass component and 16.5% by weight of a black pigment system. The glass component of each glass enamel composition was based upon a base glass frit having the following composition (in weight percent) SiO$_2$ 51.5%; B$_2$O$_3$ 12.9%; Na$_2$O 8.9%; K$_2$O 2.5%; Li$_2$O 3.0%; Al$_2$O$_3$ 3.5%; TiO$_2$ 3.0%; ZnO 12.9%; and BaO 1.8%. In each composition, the white pigment system was black pigment sold under the trade designation K-393-2 by Ferro Corporation of Cleveland, Ohio.

In glass enamel compositions 23 and 25, oxidizers were smelted into the base glass frit. In each of these compositions, the glass component and the pigment system was ground in water to an average particle size of about 3.5 microns in a ceramic ball mill. The amounts shown in Table IV below are the weight percentages of oxidizer added to the base glass frit.

In glass enamel compositions 24 and 25, an oxidizer was present as a separately added material. In each composition, the oxidizer was added as a mill addition. The amounts shown in Table IV below are the weight percentages of oxidizer added to the glass component and white pigment system as a separately added material. (Note: glass enamel composition 25 included oxidizers smelted into the base glass frit and as separately added materials).

100 g. of the solids portion of glass enamel compositions 22–25 were each blended with 50 g. of a vehicle sold under the trade designation C42 by Ferro Corporation of Cleveland, Ohio, and applied to a 3 mm section of architectural glass by screen printing to a thickness of about 2–3 mils. The architectural glass sections were then fired in a preheated electric box furnace for about 160 seconds at a temperature of about 715° C. After cooling, the whiteness of each enameled section of architectural glass was measured using a spectrophotometer (Spectraflash 600 from Data Color International; illuminant: D65; observer 10°; specular reflectance included) and reported in Table IV below in terms of L* value (where, according to the CIE 1976 L*a*b* uniform color space system, $L^* = 116(Y/Y_0)^{1/3} - 16$; and Y and $Y_0$ are coordinates of the tristimulus values of the sample and illuminant, respectively). As noted in Table IV below, the presence of an oxidizer, whether smelted in the base glass or present as a separately added material, or both, leads to the development of an enamel that is substantially more black than an enamel formed using a similar composition having no oxidizer present (e.g., glass enamel composition 22).

TABLE IV

| Glass Enamel Composition | Oxidizer (wt. % Sb$_2$O$_3$ smelted into base glass) | Oxidizer (wt. % NH$_4$NO$_3$ smelted into base glass) | Oxidizer (wt. % K$_2$S$_2$O$_8$ present as mill added material) | Whiteness (L*) |
|---|---|---|---|---|
| 22 | — | — | — | 27.0 |
| 23 | 0.5 | 0.5 | — | 25.5 |
| 24 | — | — | 1.0 | 26.0 |
| 25 | 0.5 | 1.0 | 1.0 | 25.6 |

Additional advantages and modifications will readily occur to those skilled in the art. a Therefore, the invention in its broader aspects is not limited to the specific details and illustrative examples shown and described herein. Accordingly, various modifications may be made without departing from the spirit or scope of the general inventive concept as defined by the appended claims and their equivalents.

What is claimed:

1. A lead-free and cadmium-free glass enamel composition comprising a glass component, an oxidizer, and a pigment system, said glass component comprising from about 28% to about 60% by weight SiO$_2$, from about 9% to about 21% by weight B$_2$O$_3$, up to 15% by weight Na$_2$O, up to about 13% by weight K$_2$O, up to about 6% by weight Li$_2$O, up to about 6% by weight Al$_2$O$_3$, up to about 25% by weight TiO$_2$, from 11% to about 21% by weight ZnO, up to about 20% by weight Nb$_2$O$_5$, up to about 9% by weight Bi$_2$O$_3$, up to about 11% by weight ZrO$_2$, up to about 12% by weight BaO, up to about 8% by weight SrO, up to about 5% by weight CaO, up to about 2% by weight MgO, up to about 5% weight LnO$_x$, where "Ln" is an element selected from the Lanthanide Series, up to about 6% by weight Sb$_2$O$_3$, and up to about 6% by weight fluorine, wherein said oxidizer comprises one or more compounds selected from the group consisting of Sb$_2$O$_3$, NH$_4$NO$_3$, and K$_2$S$_2$O$_8$ and is smelted into said glass component.

2. A lead-free and cadmium-free glass enamel composition comprising a glass component, an oxidizer, and a pigment system, said glass component comprising from about 28% to about 60% by weight SiO$_2$, from about 9% to about 21% by weight B$_2$O$_3$, up to about 15% by weight Na$_2$O, up to about 13% by weight K$_2$O, up to about 6% by weight Li$_2$O, up to about 6% by weight Al$_2$O$_3$, up to about 25% by weight TiO$_2$, from about 5% to about 22% by weight ZnO, up to about 20% by weight Nb$_2$O$_5$, up to about 9% by weight $Bi_2O_3$, up to about 11% by weight $ZrO_2$, up to about 12% by weight BaO, up to about 8% by weight SrO, up to about 5% by weight CaO, up to about 2% by weight MgO, up to about 5% weight $LnO_x$, where "Ln" is an element selected from the Lanthanide Series, up to about 6% by weight $Sb_2O_3$, and up to about 6% by weight fluorine, said oxidizer comprising a material added separately from said glass component comprising one or more compounds selected from the group consisting of $BaO_2$, $ZnO_2$, $H_2O_2$, $(NH_4)_2S_2O_8$, $K_2SO_4$, $Na_2SO_4$, $K_2S_2O_8$, and $Na_2S_2O_8$.

3. A lead-free and cadmium-free glass enamel composition comprising a glass component, an oxidizer, and a pigment system, said glass component comprising from about 28% to about 60% by weight $SiO_2$, from about 9% to about 21% by weight $B_2O_3$, up to 15% by weight $Na_2O$, up to about 13% by weight $K_2O$, up to about 6% by weight $Li_2O$, up to about 6% by weight $Al_2O_3$, up to about 25% by weight $TiO_2$, from 11% to about 21% by weight ZnO, up to about 20% by weight $Nb_2O_5$, up to about 9% by weight $Bi_2O_3$, up to about 11% by weight $ZrO_2$, up to about 12% by weight BaO, up to about 8% by weight SrO, up to about 5% by weight CaO, up to about 2% by weight MgO, up to about 5% weight $LnO_x$, where "Ln" is an element selected from the Lanthanide Series, up to about 6% by weight $Sb_2O_3$, and up to about 6% by weight fluorine, wherein said oxidizer is present in the glass component as a remnant.

4. A lead-free and cadmium-free glass enamel composition comprising a glass component, an oxidizer, and a pigment system, said glass component comprising from about 28% to about 60% by weight $SiO_2$, from about 9% to about 21% by weight $B_2O_3$, up to 15% by weight $Na_2O$, up to about 13% by weight $K_2O$, up to about 6% by weight $Li_2O$, up to about 6% by weight $Al_2O_3$, up to about 25% by weight $TiO_2$, from 11% to about 21% by weight ZnO, up to about 20% by weight $Nb_2O_5$, up to about 9% by weight $Bi_2O_3$, up to about 11% by weight $Zro_2$, up to about 12% by weight BaO, up to about 8% by weight SrO, up to about 5% by weight CaO, up to about 2% by weight MgO, up to about 5% weight $LnO_x$, where "Ln" is an element selected from the Lanthanide Series, up to about 6% by weight $Sb_2O_3$, and up to about 6% by weight fluorine, wherein said oxidizer comprises one or more compounds selected from the group consisting of sulfates, persulfates, and peroxides and is added separately from said glass component.

* * * * *